(12) United States Patent
Kumar (10) Patent No.: US 10,631,963 B1
(45) Date of Patent: Apr. 28, 2020

(54) PROPHY ANGLE WITH INTERNAL AIRFLOW GENERATOR

(71) Applicant: AKHA, LLC, Irvine, CA (US)

(72) Inventor: Ajay Kumar, Palmdale, CA (US)

( * ) Notice: Subject to any disclaimer, the term of this patent is extended or adjusted under 35 U.S.C. 154(b) by 528 days.

(21) Appl. No.: 14/884,296

(22) Filed: Oct. 15, 2015

Related U.S. Application Data (60) Provisional application No. 62/195,668, filed on Jul. 22, 2015.

(51) Int. Cl.
*A61C 17/16* (2006.01)
*A61C 1/00* (2006.01)
*A61C 1/12* (2006.01)
*A61C 17/00* (2006.01)

(52) U.S. Cl.
CPC ............ *A61C 17/16* (2013.01); *A61C 1/0061* (2013.01); *A61C 1/12* (2013.01); *A61C 17/005* (2013.01)

(58) Field of Classification Search
CPC ......... A61C 17/16; A61C 1/0061; A61C 1/12; A61C 1/057
See application file for complete search history.

(56) References Cited

U.S. PATENT DOCUMENTS

| | | | |
|---|---|---|---|
| 2,943,343 A * | 7/1960 | Jankelson | A61C 17/005 15/256.5 |
| 3,871,097 A * | 3/1975 | Melde | A61C 1/141 433/120 |
| 4,424,036 A * | 1/1984 | Lokken | A61C 17/005 433/116 |
| 5,028,233 A | 7/1991 | Witherby | |
| 5,078,601 A * | 1/1992 | Badoz | A61C 1/052 433/114 |
| 5,131,846 A | 7/1992 | Hall | |
| 5,310,341 A * | 5/1994 | Byer | A61C 3/02 433/116 |
| 5,348,473 A | 9/1994 | Kivlighan, Jr. | |
| 5,380,202 A | 1/1995 | Brahler | |
| 5,507,642 A * | 4/1996 | Wohlgemuth | A61C 1/05 415/904 |
| 5,547,376 A | 8/1996 | Harrel | |
| 5,584,690 A | 12/1996 | Maassarani | |
| 5,690,488 A * | 11/1997 | Spinello | A61C 17/005 433/116 |
| 5,775,905 A | 7/1998 | Weissenfluh et al. | |
| 5,797,744 A | 8/1998 | Rosenberg | |
| 6,203,322 B1 | 3/2001 | Kraenzle | |

(Continued)

*Primary Examiner* — Yogesh P Patel
*Assistant Examiner* — Stephen R Sparks
(74) *Attorney, Agent, or Firm* — Innovation Capital Law Group, LLP; Vic Lin (57) ABSTRACT

A dental prophy angle reduces the ejection of blood, dental polish, and saliva from a patient's mouth during a dental procedure. The dental prophy angle includes a drive head with an airflow generator is positioned within the drive head. The airflow generator produces an airflow pattern that exits from the drive head. A prophy cup is attached to the drive head. The airflow pattern travels over the outer surface of the prophy cup. The air flow pattern reduces the amount of material that builds up on the outer surface of the prophy cup, thereby reducing the ejection of material from the patient's mouth. In certain embodiments, the prophy cup is transparent to enable a dental practitioner to visualize the prophy paste within the prophy cup.

12 Claims, 5 Drawing Sheets

(56) References Cited

U.S. PATENT DOCUMENTS

| | | | |
|---|---|---|---|
| 6,273,716 B1 | 8/2001 | Wade | |
| 6,315,559 B1 * | 11/2001 | Nakanishi | A61C 1/14 433/116 |
| 6,350,124 B1 * | 2/2002 | Wade | A61C 1/16 433/116 |
| 6,382,971 B1 * | 5/2002 | Randolph | A61C 17/005 433/125 |
| 6,632,090 B1 * | 10/2003 | Randolph | A61C 17/005 433/125 |
| 6,948,934 B2 | 9/2005 | Wade | |
| 8,784,102 B1 | 7/2014 | Kumar | |
| 9,662,180 B2 * | 5/2017 | Boehm | A61C 17/02 |
| 2004/0154112 A1 * | 8/2004 | Braun | A46B 15/0002 15/22.1 |
| 2011/0065063 A1 * | 3/2011 | Bock | A61C 1/14 433/118 |

* cited by examiner

PROPHY ANGLE WITH INTERNAL AIRFLOW GENERATOR

RELATED APPLICATIONS

This application claims the benefit of U.S. Provisional Application No. 62/195,668 filed on Jul. 22, 2015, for "Prophy Angle with Internal Airflow Generator," which is incorporated by reference herein.

BACKGROUND OF THE INVENTION

Field of the Invention

This application is directed to dental accessories, and, more particularly, is directed to an apparatus and method for reducing accumulated liquids and other materials on a prophy cup during dental procedures.

Description of the Related Art

One of the most widely used prophylactic devices in the dental profession is known as a prophy cup. The prophy cup is attached to a prophy angle, which is mounted on a dental handpiece. The dental handpiece provides rotating energy to the prophy angle. The rotating energy is communicated to the prophy cup to cause the prophy cup to rotate. Prophy paste is picked up in the prophy cup and is applied against the tooth surface to remove the deposits. The prophy paste contains abrasive particles, which mix with saliva to form slurry. If allowed to build up, the slurry almost invariably entrains the patient's saliva to form an ever-enlarging rope-like mass which migrates along the surfaces of the cup. The rope-like slurry leaves the cup at its narrowest diameter. The slurry is not confined to the patient's mouth and can be ejected with sufficient velocity to create a contamination area that can be up to 40-50 inches wide and up to 30-40 inches high. The ejected slurry may contain blood-borne pathogens, which can raise the level of contamination. Applicant's prior U.S. Pat. No. 8,784,102 discloses improvements for reducing the buildup of slurry on a prophy cup.

SUMMARY OF THE INVENTION

A need exists for a system and method that further reduces the buildup of blood, dental polish, saliva and other materials on the outer surface of a prophy cup so that the materials are not ejected from a patient's mouth during a dental procedure.

The dental prophy angle disclosed herein reduces the ejection of blood, dental polish, and saliva from a patient's mouth during a dental procedure. The dental prophy angle comprises a drive head. An airflow generator is positioned within the drive head. The airflow generator produces an airflow pattern that exits from the drive head. A prophy cup is attached to the drive head. The airflow pattern travels over the outer surface of the prophy cup. The air flow pattern reduces the amount of material that builds up on the outer surface of the prophy cup, thereby reducing the ejection of material from the patient's mouth.

An aspect in accordance with embodiments disclosed herein is a dental prophy angle that comprises a drive shaft that rotates about a first axis and an output shaft coupled to the drive shaft. The output shaft rotates about a second axis when the drive shaft rotates about the first axis. The output shaft has a proximal end and a distal end. The output shaft also has a distal portion near the distal end. The dental prophy angle further includes a drive head that encloses the output shaft. The drive head has a distal portion. The dental prophy angle further includes a prophy cup having an outer surface between a proximal end and a distal end. The proximal end of the prophy cup is attached to the distal end of the output shaft. An airflow generator is positioned within the distal portion of the drive head. The airflow generator is responsive to the rotation of the output shaft to generate an airflow pattern over the outer surface of the prophy cup. The airflow pattern reduces the buildup of material on the outer surface of the prophy cup.

In certain embodiments, the airflow generator comprises a generally cylindrical shell that forms the distal portion of the drive head. The shell has a distal end. A rotating blade fan is positioned within the shell proximal to at least the proximal end of the prophy cup. The fan is coupled to the output shaft to rotate with the output shaft to generate the airflow pattern. The shell has at least one air inlet proximal to the fan. The air inlet provides a source of air to the fan. The shell has an air outlet at the distal end of the shell distal to the fan. The fan draws air through the air inlets and expels the air through the air outlet and over the outer surface of the prophy cup. In certain embodiments, the air flow generator is an integral portion of the drive head.

In certain embodiments, the prophy cup is sized to be at least partially inserted into the distal end of the airflow generator. In certain embodiments, the prophy cup is transparent or translucent to enable a dental practitioner to visibly determine the amount of prophy paste in the prophy cup.

In certain embodiments, the airflow generator includes a wiper. The wiper is positioned proximal to the prophy cup and having at least one blade edge. The at least one blade edge conforming to at least a portion of the contour of the outer surface of the prophy cup. The wiper is positioned with the at least one blade edge sufficiently close to the outer surface of the prophy cup. The wiper removes material from the outer surface of the prophy cup and thereby reduces the accumulation of material on the outer surface of the prophy cup.

In certain embodiments, the shell includes a distal end portion proximate to the air outlet. The distal end portion includes a notch sized to accommodate a portion of the wiper.

Another aspect in accordance with embodiments disclosed herein is a dental prophy angle that comprises a drive head having a distal end portion. An airflow generator is positioned within the distal end portion of the drive head. The airflow generator produces an airflow pattern that exits from the distal end portion of the drive head. A prophy cup is coupled to the drive head. The air flow pattern travels over the outer surface of the prophy cup.

BRIEF DESCRIPTION OF THE DRAWINGS

The foregoing aspects and other aspects of this disclosure are described in detail below in connection with the accompanying drawing figures in which.

DETAILED DESCRIPTION OF PREFERRED EMBODIMENTS

A prophy angle with internal airflow generator is disclosed in the attached drawings and is described below. The embodiment is disclosed for illustration of the prophy angle with internal airflow generator and is not limiting except as defined in the appended claims.

FIGS. 1-5 illustrate a dental prophy angle 100 comprising a housing 102 having a main body portion 104 and a removable cap portion 106. The housing is similar to the housing shown in U.S. Pat. No. 8,784,102, which is incorporated by reference herein. In U.S. Pat. No. 8,784,102, the housing is configured as a clam shell with the cap portion hinged to the main body portion. A similar configuration can be used for the prophy angle disclosed herein; however, in the illustrated embodiment, the main body portion and the cap portion are not hingedly connected. After installing the components described below, the cap is aligned and attached to the main body portion and then secured to the main body portion by ultrasonic welding. The cap and the main body portion include a plurality of tabs and other alignment features, which are shown in the drawings but are not described herein.

Figure 1:
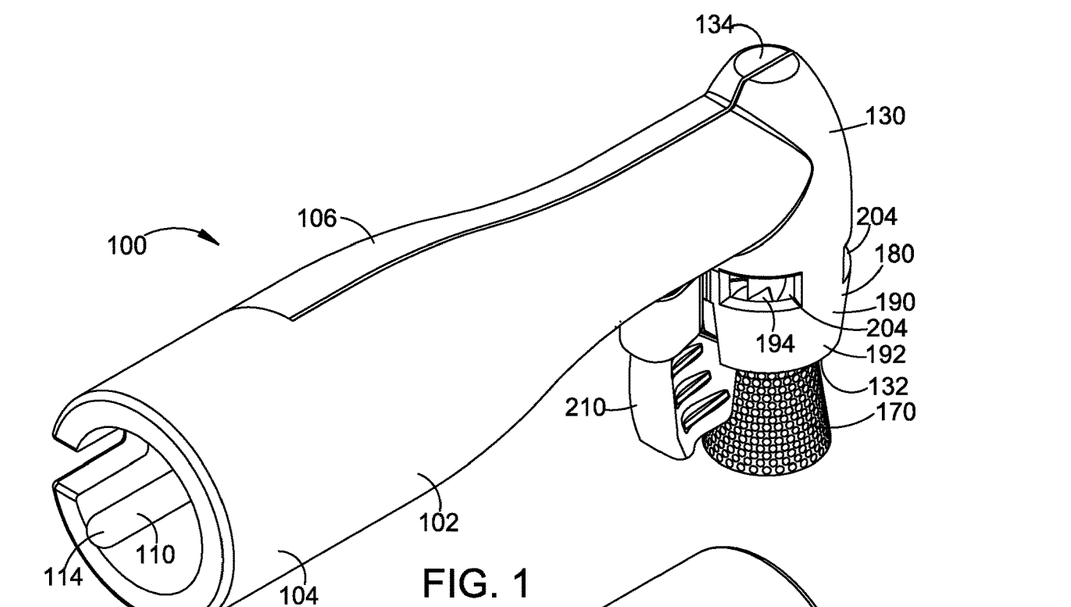
FIG. 1 illustrates a perspective view of the prophy angle viewed from the proximal (drive) end of the prophy angle.
Figure 2:
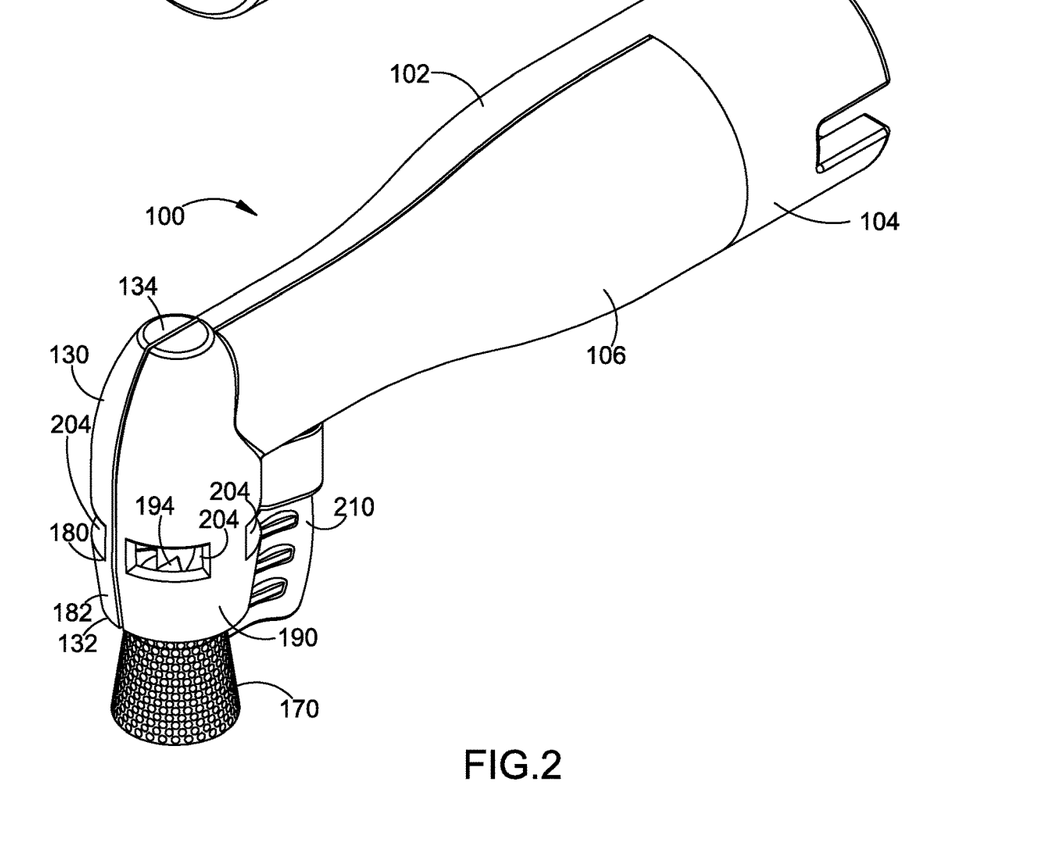
FIG. 2 illustrates a perspective view of the prophy angle of FIG. 1 viewed from the distal end of the prophy angle.
Figure 3:
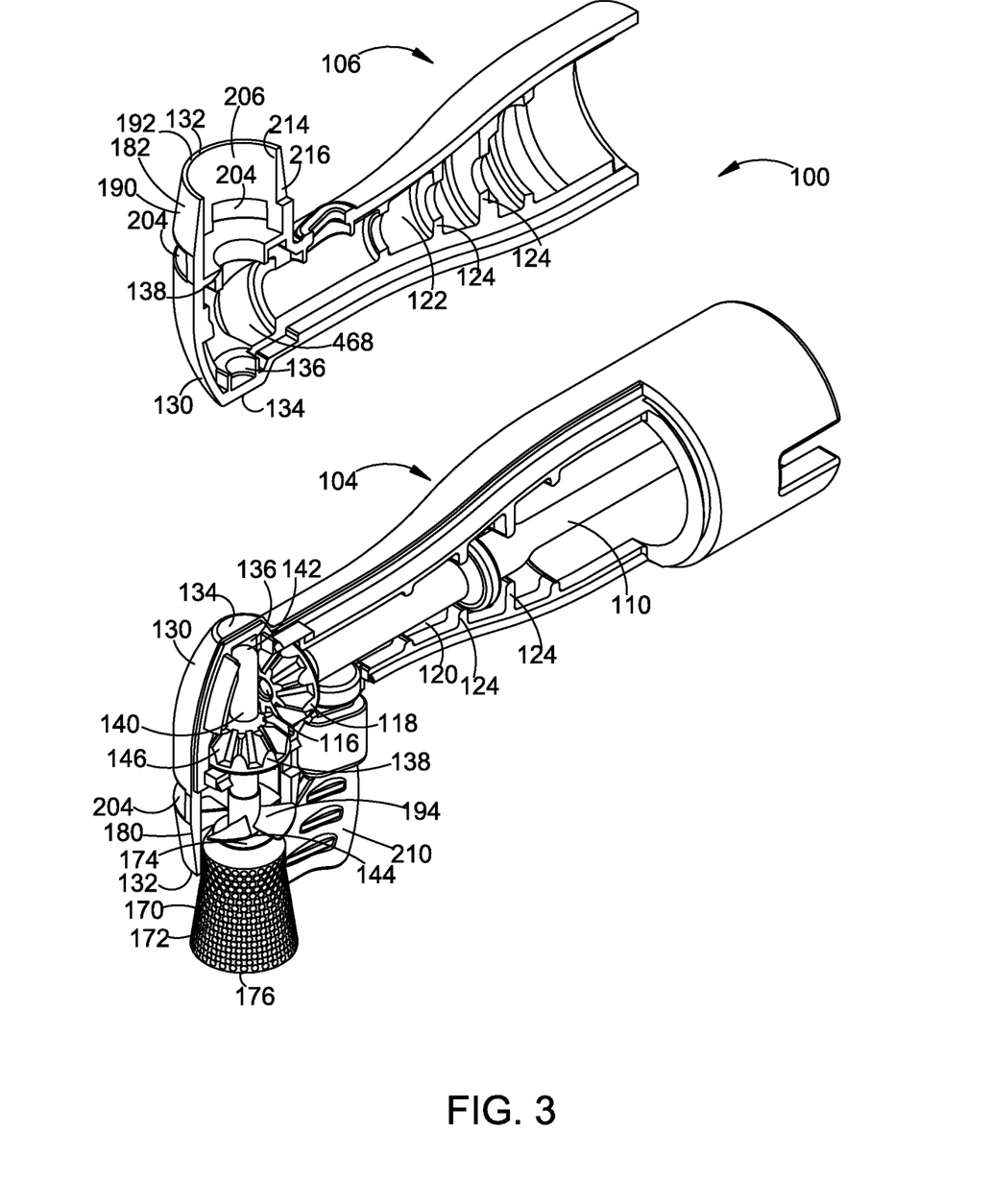
FIG. 3 illustrates a perspective view of the prophy angle of FIGS. 1 and 2 viewed from the distal end as in FIG. 2 with the cap portion of the housing removed and inverted to show the inside configuration of the cap portion, the view further showing the drive mechanism and the internal airflow generator.
Figure 4:
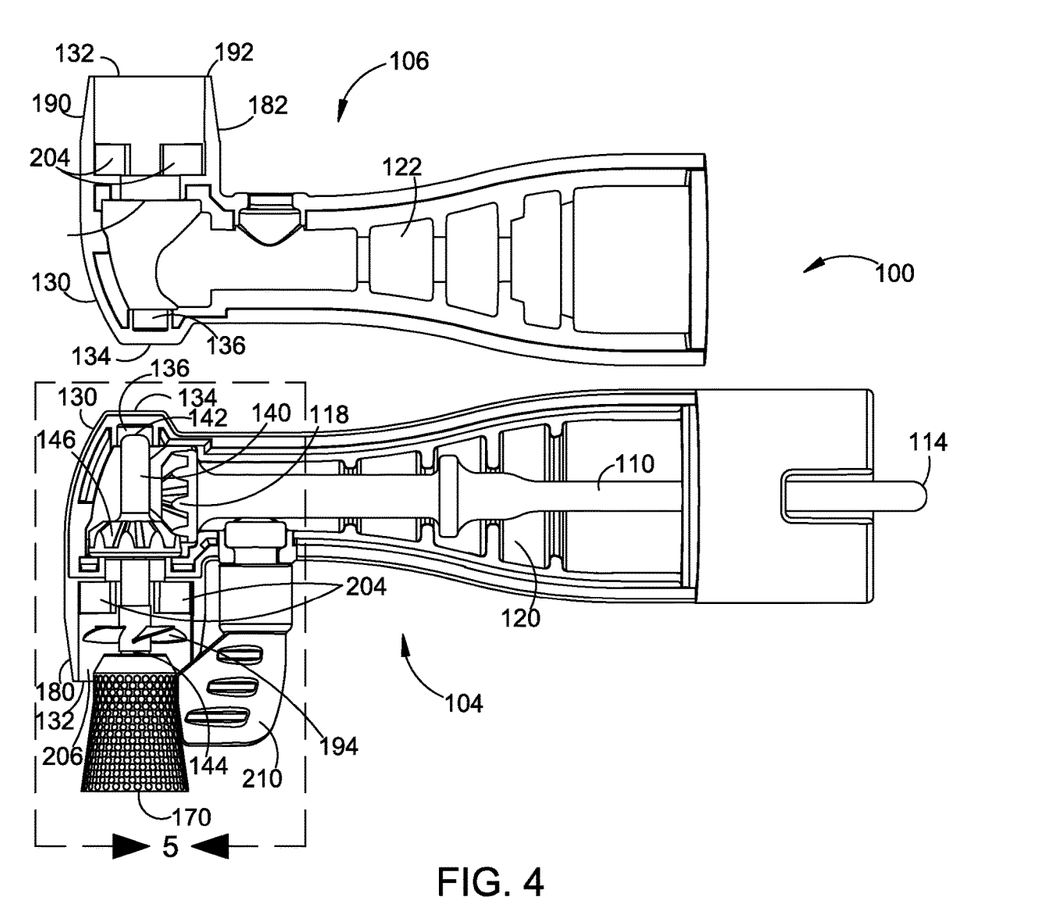
FIG. 4 illustrates a side elevational view of the prophy angle of FIG. 3 with cap portion removed and inverted as in FIG. 4.

The dental prophy angle 100 comprises a drive shaft 110 that rotates about a first axis 112. A proximal end 114 of the drive shaft is engageable with a dental handpiece (not shown) that transfers rotational power to the drive shaft in a conventional manner. A distal end 116 of the drive shaft includes a first bevel gear 118, which rotates when the drive shaft rotates about the first axis. As shown in FIG. 3, for example, the drive shaft extends through a generally cylindrical cavity formed a first cavity half 120 in the main body portion 104 and a second cavity half 122 formed in the cap portion 106. The two cavity halves include a plurality of ridges 124 with cylindrical openings that support the drive shaft.

The distal ends of the main body portion 104 and the cap portion 106 form a drive head 130 having a distal end 132 and a proximal end 134. The proximal end of the drive head includes a bearing cavity 136 and a central bearing surface 138 with the main body portion and the cap portion forming respective halves of the bearing cavity and the bearing surface.

An output shaft 140 extends between a proximal end 142 that rests in the bearing cavity 136 of the drive head 130 and a distal end 144 that extends generally to the distal end 132 of the drive head. A middle portion of the output shaft supports a second bevel gear 146, which engages the first bevel gear 118. The second bevel gear rests on the central bearing surface 138 such that the output shaft is constrained between the bearing cavity and the bearing surface.

Figure 5:
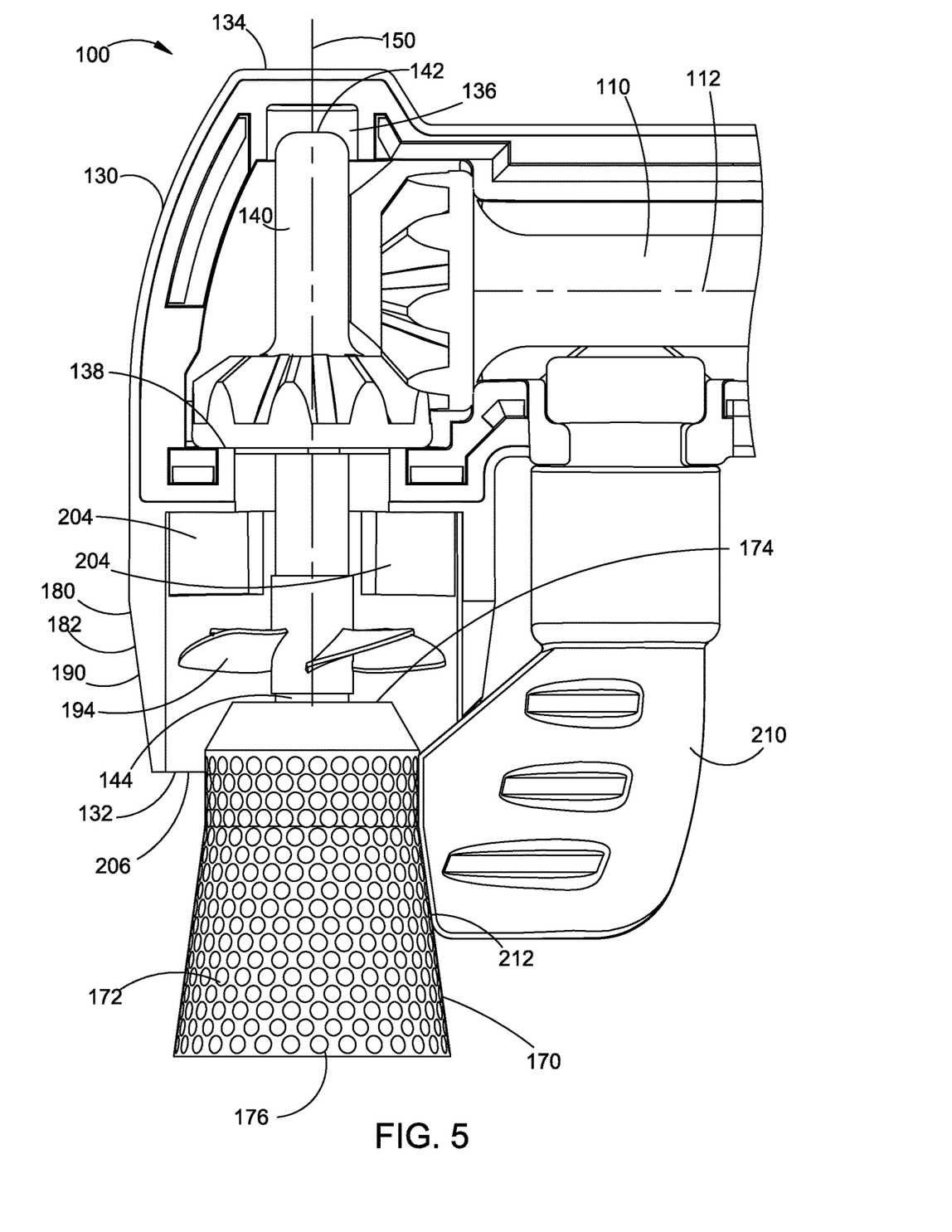
FIG. 5 illustrates an enlarged side elevational view of the prophy angle of FIG. 4 taken within the rectangular area -5- in FIG. 4.

As show in FIG. 5, the drive shaft 110 rotates about the first axis 112 when driven by an external handpiece (not shown). The engagement of the first bevel gear 118 with the second bevel gear 146 causes the output shaft 140 to rotate about a second axis 150 in response to the rotation of the drive shaft. In the illustrated embodiment, the first and second axes are orthogonal. In alternative embodiments, the two axes may be oriented at different angles with respect to each other.

The dental prophy angle 100 further includes a prophy cup 170 having an outer surface 172 between a proximal end 174 and a distal end 176. The proximal end of the prophy cup is attached to the distal end 144 of the output shaft 140. As shown in FIG. 5, the prophy cup has a dimpled outer surface similar to the prophy cup disclosed in U.S. Pat. No. 8,784,102. In other embodiments, the prophy cup can have a variety of shapes, sizes, and polishing surfaces. For example, the outer surface of the prophy cup can be smooth. The prophy cup can be attached to the output shaft using several methods. In certain embodiments, the prophy cup can be screwed onto the output shaft. In other embodiments, the prophy cup can be press-fit onto the shaft or ultrasonically welded to the output shaft. In certain embodiments, the prophy cup comprises a transparent or translucent material that enables a dental practitioner to visibly determine the amount of prophy paste in the prophy cup.

Figure 6:
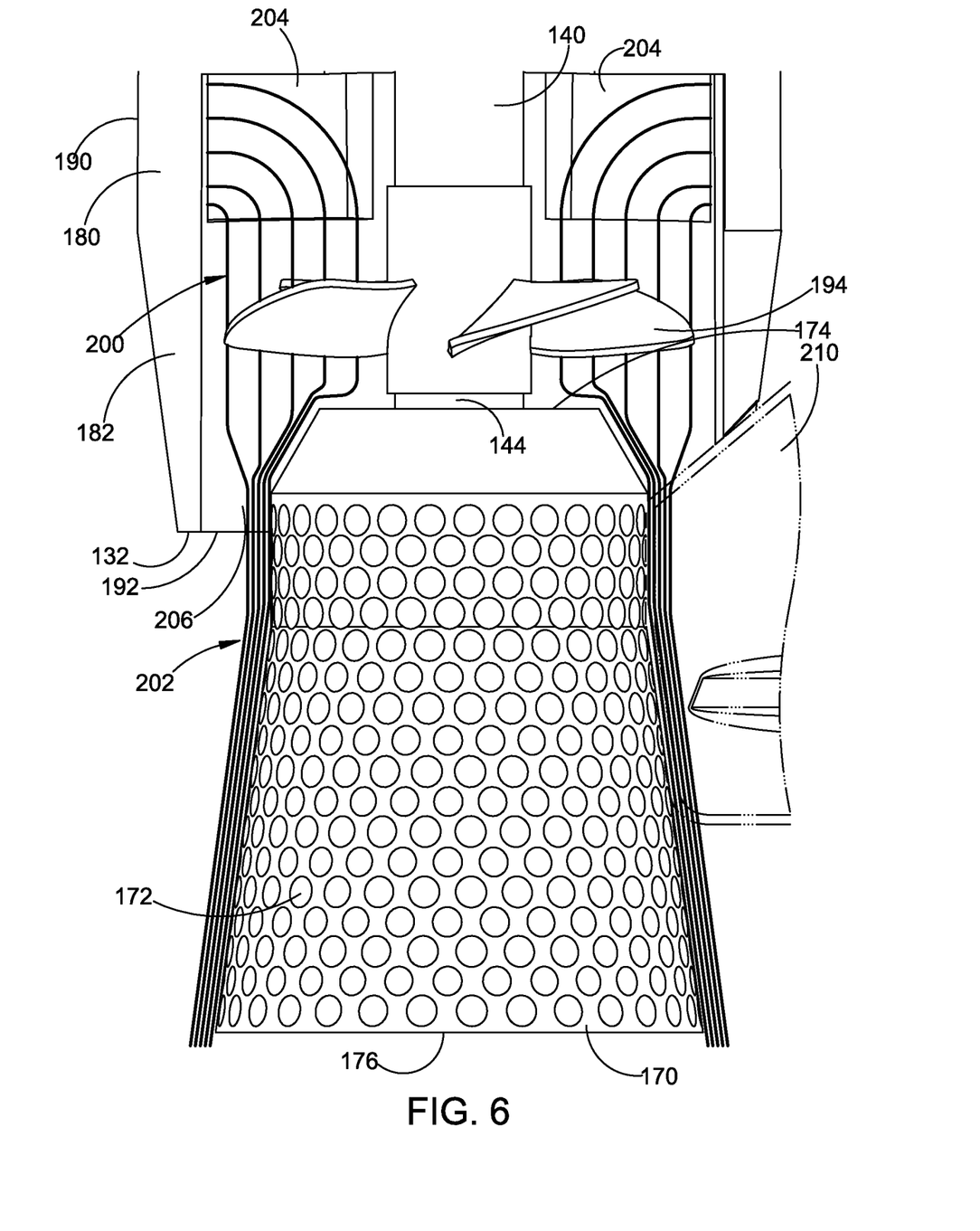
FIG. 6 illustrates a further enlarged side elevational view showing the airflow generator and the prophy cup in accordance with FIG. 5 with a plurality of airflow lines pictorially superimposed on the airflow generator and the prophy cup.

The dental prophy angle 100 further includes an airflow generator 180 that forms a distal portion 182 of the drive head 130. The airflow generator responds to the rotation of the output shaft to cause air to flow over the outer surface 172 of the prophy cup 170 as described below with respect to FIG. 6. The air flowing over the outer surface reduces the buildup of material on the outer surface of the prophy cup. The reduction of buildup of material on the outer surface of the prophy cup reduces the amount of splatter containing a mixture of blood, dental polish, and saliva ejected from a patients mouth.

In the illustrated embodiment, the airflow generator 180 comprises a generally cylindrical shell 190 that forms the distal portion 182 of the drive head 130. The shell has a distal end 192. A rotating blade fan 194 is positioned within the shell near the proximal end 174 of the prophy cup 170. The fan is coupled to the output shaft 140. The fan can be coupled to the output shaft using multiple methods. In certain embodiments, the fan is secured to the output shaft by ultrasonic welding. In other embodiments, the fan is press-fit onto the output shaft. In another embodiment, the output shaft and the fan are molded as an integral unit (e.g., the output shaft and the fan are formed at the same time as a single plastic unit). Although described as a fan, it should be understood that other airflow generation devices driven by a rotating shaft can also be used.

The fan 194 is rotated by the output shaft 140 when the output shaft is rotated by the drive shaft 110. The rotation of the fan generates an overall airflow pattern that comprises an input airflow pattern 200 and an output airflow pattern 202. The input airflow pattern is supplied to a proximal side of the fan by at least one air inlet 204 formed through the shell 190. In the illustrated embodiment, four air inlets 204 are spaced about the shell proximal to the fan. The fan draws in the input airflow pattern and generates the output airflow pattern shown in FIG. 6. The output airflow pattern generated by the fan flows over the outer surface 172 of the prophy cup 170 and exits via an air outlet 206 at the distal end 192 of the shell. The flow of the air over the outer surface of the prophy cup is caused in part by the Coanda effect, which is the tendency of a jet of fluid to attach itself to a nearby surface and remain attached even when the surface curves away from the initial jet direction. Thus, the output airflow pattern remains close to the outer surface of the prophy cup as the air flows toward the distal end 176 of the prophy cup.

As shown in FIG. 5, the proximal end 174 of the prophy cup is sized to be at least partially inserted into the air outlet 206 at the distal end 192 of the shell 190 of the air flow generator 180 such that the proximal end of the prophy cup is close to the output (e.g., the distal side) of the fan 194.

In the illustrated embodiment, the airflow generator 180 is molded as an integral part of the drive head 130 of the prophy angle 100 such that the shell 190 forms a distal portion of the drive head. In an alternative embodiment, the shell and other components of the air flow generator may be added to an existing prophy angle.

In certain embodiments of the dental prophy angle 100 further comprises a wiper 210. The wiper is positioned proximal to the prophy cup 170. The wiper has at least one blade edge 212. The blade edge has a shape selected to conform to a portion of the contour of the outer surface 172 of the prophy cup. The wiper is positioned with the at least one blade edge sufficiently close to the outer surface of the prophy cup to scrape material from the outer surface of the prophy cup as described in U.S. Pat. No. 8,784,102.

In certain embodiments a distal end portion 214 of the shell includes a notch 216 sized to accommodate a portion of the wiper 210. The notch constrains the wiper so that the wiper remains positioned with the blade 212 against the outer surface 172 of the prophy cup 170.

In summary, the dental prophy angle 100 comprises the drive head 130 having the airflow generator 180 positioned within a distal portion proximate to the distal end of the drive head. The airflow generator produces the airflow pattern 202 that exits from the outlet 206 of the drive head. The prophy cup 170 is coupled to the drive head and rotates with respect to the drive head. The airflow pattern flows over the outer surface 172 of the rotating prophy cup to cause material on the prophy cup to be removed from the outer surface to reduce material buildup on the outer surface.

One skilled in art will appreciate that the foregoing embodiments are illustrative of the present invention. The present invention can be advantageously incorporated into alternative embodiments while remaining within the spirit and scope of the present invention, as defined by the appended claims.

What is claimed is:

1. A dental prophy angle, comprising:
   a drive shaft that rotates about a first axis;
   an output shaft coupled to the drive shaft, the output shaft rotating about a second axis when the drive shaft rotates about the first axis, the output shaft having a proximal end, and a distal end, and having a distal portion near the distal end;
   a drive head enclosing the output shaft, the drive head having a distal portion;
   a prophy cup having an outer surface between a proximal end and a distal end, the proximal end of the prophy cup attached to the distal end of the output shaft; and
   an airflow generator within a shell at the distal portion of the drive head, the airflow generator including a rotating blade fan that rotates to generate an airflow pattern over the outer surface of the prophy cup from the proximal end of the prophy cup toward the distal end of the prophy cup, the airflow pattern reducing the buildup of material on the outer surface of the prophy cup;
   at least one air inlet formed through the shell of the drive head proximal to the fan to provide a source of air to the fan; and
   an air outlet at a distal end of the shell distal to the fan, the fan drawing air through the air inlets and forcing the air out the air outlet over the outer surface of the prophy cup.

2. The dental prophy angle as defined in claim 1, wherein the shell of the airflow generator is an integral portion of the drive head.

3. The dental prophy angle as defined in claim 1, wherein the air generator further comprises, a wiper positioned proximal to the prophy cup, the wiper having at least one blade edge, the at least one blade edge having a shape selected to conform to at least a portion of a contour of the outer surface of the prophy cup, the wiper positioned with the at least one blade edge sufficiently close to the outer surface of the prophy cup to remove fluid from the outer surface of the prophy cup and thereby reduce accumulation of material on the outer surface.

4. The dental prophy angle as defined in claim 3, wherein the shell includes a distal end portion proximate to the air outlet, the distal end portion including a notch sized to accommodate a portion of the wiper.

5. The dental prophy angle as defined in claim 1, wherein the prophy cup is transparent.

6. The dental prophy angle as defined in claim 1, wherein the prophy cup is transparent.

7. A dental prophy angle, comprising:
   a drive head having a distal end portion;
   an airflow generator within a shell at the distal end portion of the drive head, the airflow generator including a rotating blade fan that rotates to produce an airflow pattern that exits from the distal end portion of the drive head; and
   a prophy cup coupled to the drive head and having an outer surface with a proximal end coupled to the drive head and a distal end opposite the proximal end, the airflow pattern flowing over the outer surface of the prophy cup from the proximal end of the prophy cup toward the distal end of the prophy cup;
   at least one air inlet formed through the shell of the drive head proximal to the fan to provide a source of air to the fan; and
   an air outlet at a distal end of the shell distal to the fan, the fan drawing air through the air inlets and forcing the air out the air outlet over the outer surface of the prophy cup.

8. The dental prophy angle as defined in claim 7, wherein the prophy cup is transparent.

9. A dental prophy angle, comprising:
   a drive shaft that rotates about a first axis;
   an output shaft coupled to the drive shaft, the output shaft rotating about a second axis when the drive shaft rotates about the first axis, the output shaft having a proximal end, and a distal end, and having a distal portion near the distal end;
   a drive head enclosing the output shaft, the drive head having a distal portion;
   a prophy cup having an outer surface between a proximal end and a distal end, the proximal end of the prophy cup attached to the distal end of the output shaft;
   a cylindrical shell forming the distal portion of the drive head, the shell having a distal end;

a fan positioned within the shell proximal to at least the proximal end of the prophy cup, the fan coupled to the output shaft to rotate with the output shaft to generate an airflow pattern;

at least one air inlet formed through the shell of the drive head proximal to the fan to provide a source of air to the fan; and an air outlet at the distal end of the shell distal to the fan, the fan drawing air through the air inlets and forcing the air out the air outlet over the outer surface of the prophy cup from the proximal end of the prophy cup toward the distal end of the prophy cup.

10. The dental prophy angle as defined in claim 9, wherein the shell is an integral portion of the drive head.

11. The dental prophy angle as defined in claim 9, further comprising a wiper positioned proximal to the prophy cup, the wiper having at least one blade edge, the at least one blade edge having a shape selected to conform to at least a portion of a contour of the outer surface of the prophy cup, the wiper positioned with the at least one blade edge sufficiently close to the outer surface of the prophy cup to remove fluid from the outer surface of the prophy cup and thereby reduce accumulation of material on the outer surface.

12. The dental prophy angle as defined in claim 11, wherein the shell includes a distal end portion proximate to the air outlet, the distal end portion including a notch sized to accommodate a portion of the wiper.

\* \* \* \* \*